(12) United States Patent
Wong et al.

(10) Patent No.: US 7,983,691 B1
(45) Date of Patent: Jul. 19, 2011

(54) GEOGRAPHICALLY LOCALIZING MOBILE COMMUNCIATION DEVICES

(75) Inventors: Bernard Wong, Ithaca, NY (US); Samir Goel, San Jose, CA (US); Ravi Jain, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 584 days.

(21) Appl. No.: 11/557,097

(22) Filed: Nov. 6, 2006

(51) Int. Cl.
*H04W 24/00* (2009.01)
*H04M 3/42* (2006.01)

(52) U.S. Cl. ............... 455/456.1; 455/414.2; 455/456.2; 455/456.5; 455/456.6

(58) Field of Classification Search ............... 455/456.1, 455/456.2, 456.3, 456.5, 456.6, 457, 414.1, 455/414.2
See application file for complete search history.

(56) References Cited

U.S. PATENT DOCUMENTS

| | | | | |
|---|---|---|---|---|
| 6,677,894 | B2 * | 1/2004 | Sheynblat et al. | 342/357.1 |
| 6,947,978 | B2 * | 9/2005 | Huffman et al. | 709/220 |
| 7,509,131 | B2 * | 3/2009 | Krumm et al. | 455/456.1 |
| 2002/0143991 | A1 * | 10/2002 | Chow et al. | 709/245 |
| 2004/0152493 | A1 * | 8/2004 | Phillips et al. | 455/567 |
| 2004/0203873 | A1 * | 10/2004 | Gray | 455/456.1 |
| 2006/0056420 | A1 * | 3/2006 | Okuda et al. | 370/395.54 |
| 2008/0037536 | A1 * | 2/2008 | Padmanabhan et al. | 370/389 |

OTHER PUBLICATIONS

Bamba Gueye, Constraint-Based Geolocation of Internet Hosts, Copyright 2004 ACM 1-58113-821-0/04/0010, pp. 288-293.*
Constantinos Dovrolis, Packet-Dispersion Techniques and a capacity-Estimation Methodology, IEEE/ACM Transactions On Networking, Jun. 3, 2003, 1063-6692/04, pp. 963-977.*
Gueye, et al., "*Leveraging Buffering Delay Estimation for Geolocation of Internet Hosts*", In Proceedings of /Internet Measurement Conference/, Taormina, Sicily, Italy, Oct. 2004.
Padmanabhan, et al., "*An Investigation of Geographic Mapping Techniques for Internet Hosts*", Sigcomm'01 San Diego, California, Aug. 27-31, 2001.
Gueye, et al., "*Constraint-Based Geolocation of Interests Hosts*", IEEE ACM Transactions of Networking, In Proceedings of /Internet Measurement Conference/, Taormina, Sicily, Italy, Oct. 2004.
Katz-Bassett, et al., "*Towards IP Geolocation Using Delay and Topology Measurements*", IMC'06 Rio de Janeiro, Brazil , Oct. 25-27, 2006.
Wong, et al., "*Geolocalization on the Internet through Constraint Satisfaction*" In Proceedings of Workshop on Real, Large Distributed Systems/, Seattle, Washington, Nov. 2006.

* cited by examiner

*Primary Examiner* — Un C Cho
(74) *Attorney, Agent, or Firm* — Fish & Richardson P.C.

(57) ABSTRACT

This specification describes technologies relating to geographically localizing mobile communication devices. In general, one aspect of the subject matter described in this specification can be embodied in a method that includes receiving information corresponding to a location of a wireless landmark in a mobile communication network. The method also includes communicating with the wireless landmark to estimate the location of a first node in the mobile communication network proximate to the wireless landmark. Other embodiments of this aspect include corresponding systems, apparatus, and computer program products.

25 Claims, 10 Drawing Sheets

GEOGRAPHICALLY LOCALIZING MOBILE COMMUNCIATION DEVICES

TECHNICAL FIELD

This disclosure generally relates to geographically localizing mobile communication devices using Internet Protocol (IP) address information.

BACKGROUND

In computer networks, such as the Internet, analysis of the network itself can provide many benefits to users. For example, analysis of the nodes through which a message passes along its route can help in diagnosing transmission problems, and may also provide other valuable information. Such information may be obtained using publicly available tools like 'traceroute' or 'ping' commands.

Similar structural knowledge about a network can be particularly helpful with respect to mobile devices on a network. For example, if the general location of a mobile device, such as a cellular telephone or smartphone, can be discerned, a system may send the device information targeted to the location. As one example, if a user of a mobile device submits a search for "Starbucks," a system can use the location of the device to deliver contact information only for particular stores in the area of the device.

Although locations can be determined from explicit information provided over the network, such as global positioning system (GPS) data from a GPS-enabled device, or data provided by a carrier associated with the device, such explicit information is not always available. As such, the location of a device may need to be inferred. Such an inference may be made in conventional wired networks by using traceroute, ping, or similar techniques to determine the time for a probe data packet to propagate from one node (e.g., router) to another, and to thereby identify geographic constraints on the locations of nodes having unknown locations vis-a-vis nodes having known locations (called landmarks). However, such techniques can introduce problems in mobile communication networks, for example, if the final wireless hop has substantially more delay (e.g., caused by latency or bandwidth limitations) than do the wired hops in the path, the final delay will overshadow relatively fine distinctions in delay used to locate nodes.

In addition, many wireless carriers have relatively few gateway routers that connect their mobile networks to the Internet. They have limited diversity in the paths that packets can take (because all packets must pass through the gateways), and thus the delay measurements are less independent and provide less information. Carrier's mobile networks may also be rather opaque to conventional network mapping techniques, such as by including routers that do not respond to probe packets; by having routers that lack geographically meaningful names like those operated by administrators who assign routers city names, airport codes, or areas codes as part of the names; by routing packets in ways that differ from the public internet; and by exposing only the IP address of a proxy host or gateway router.

SUMMARY

This specification describes technologies relating to geographically localizing mobile communication devices. In general, one aspect of the subject matter described in this specification can be embodied in a method that includes receiving information corresponding to a location of a wireless landmark in a mobile communication network. The method also includes communicating with the wireless landmark to estimate the location of a first node in the mobile communication network proximate to the wireless landmark. Other embodiments of this aspect include corresponding systems, apparatus, and computer program products.

Another general aspect of the subject matter described in this specification can be embodied in a method for estimating network device locations that includes obtaining an IP address of a mobile device and obtaining an IP address of a router that serves a geographic region containing the mobile device, based on the IP address of the mobile device. The method also includes determining a geographic region corresponding to the router based on the IP address of the router. The method further includes outputting an estimated location of the mobile device based on the geographic region corresponding to the router.

A further general aspect of the subject matter described in this specification can be embodied in a system for providing location estimates of network devices that includes a wireless landmark locator to receive location information from a wireless landmark and identify a location for the landmark. The system also includes means for determining location information of one or more intermediate network nodes using the location for the landmark. The system further includes a mobile device interface configured to estimate a location for a mobile device communicating with the system using the location information of the one or more intermediate nodes.

These and other embodiments can optionally include one or more of the following specific aspects. The method can further include determining estimated locations of one or more intermediate nodes in the mobile communication network using the estimated location of the first node and outputting one or more estimated locations of the one or more intermediate nodes. The mobile communication network can include a cellular network, a WiFi network (based on one of the IEEE 802.11 standards), or a WiMAX network (based on one of the IEEE 802.16 standards). The one or more intermediate nodes can include one of intermediate routers or one of last-hop routers. Receiving information corresponding to a location of a wireless landmark can include receiving a message from the wireless landmark containing a location indicator generated by the wireless landmark. Determining estimated locations of one or more intermediate nodes in the mobile communication network can include obtaining network delay values between nodes in the network, and transforming the network delays into distance constraints.

Obtaining network delay values can include performing a plurality of network delay measurements and selecting a minimum network delay from the plurality of network delay measurements. Obtaining network delay values can further include obtaining a bandwidth delay and subtracting the bandwidth delay from the minimum network delay. Obtaining the bandwidth delay can include performing a packet-pair dispersion measurement. Obtaining the location information of the one or more intermediate nodes can include obtaining geographic boundaries for the one or more intermediate nodes based on the distance constraints.

Obtaining the geographic boundaries for the one or more intermediate nodes can include identifying an overlapped region from a plurality of circles having radii derived from the distance constraints. Obtaining the geographic boundaries for the one or more intermediate nodes can further include narrowing the overlapped region by obtaining network delay values between one or more wired landmarks and the one or more intermediate nodes.

The method can additionally include determining an estimated location of a mobile device by using the locations of one or more nodes of the one or more intermediate nodes whose locations have been estimated. The method can further include iteratively communicating with wired landmarks in the mobile communication network to obtain network delay values for a plurality of network routes, and using the network delay values to improve the estimated locations of the one or more intermediate nodes. Determining an estimated location of the mobile device can include obtaining a geographic boundary for the mobile device based on distance constraints derived from the intermediate node locations.

The IP address of the router can be obtained from a first database, and the geographic region corresponding to the IP address of the router can be obtained from a second database that differs from the first database. The router can include a last-hop router serving the mobile device. Determining a geographic region corresponding to the router can include obtaining network delay values related to the router using location and constraint information of one or more landmarks, and translating the network delay values into distance constraints. Determining a geographic region corresponding to the router can further include obtaining a geographic boundary for the router based on the distance constraints. Obtaining the geographic boundary for the router can include obtaining an overlapped region from a plurality of circles having radii that are based on the distance constraints. The landmarks can include one of wireless landmarks, wired landmarks, and intermediate landmarks.

Particular embodiments of the subject matter described in this specification can be implemented to realize one or more of the following advantages. The approximate geographic location of a mobile communication device can be determined without collaboration or assistance from a wireless carrier, the device manufacturer, or an application vendor. The network topology of a relatively opaque wireless carrier network can be estimated, and geographic localization of a mobile device communicating with such opaque network can be achieved. Geographic localization to a metropolitan area can be achieved without having additional hardware (e.g., a GPS chip) or application software installed on the mobile device. Such localization can be achieved even when a wireless carrier only has a few gateway routers from the Internet to its carrier network. Further, time-consuming network delay measurements can be minimized by incorporating a quasi-static mapping with a historical database of localization estimates for last-hop and intermediate routers in the mobile network.

Additionally, geographic localization described in this specification can be implemented at the application layer or in networks where there are only control over the end points (e.g., networks like Akamai, peer-to-peer networks like Skype, or anonymizing networks like Tor). Moreover, certain techniques described in this specification (e.g., using the network delay measurement over the last hop) can be used to infer that the end device is a mobile device, as well as obtain a rough estimate of the distance of the device from the last hop router, if the characteristics of the network is known.

The general and specific aspects may be implemented using a system, method, or a computer program, or any combination of systems, methods, and computer programs. The details of one or more embodiments are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

Like reference symbols in the various drawings indicate like elements.

DETAILED DESCRIPTION OF EXEMPLARY EMBODIMENTS

Figure 1A:
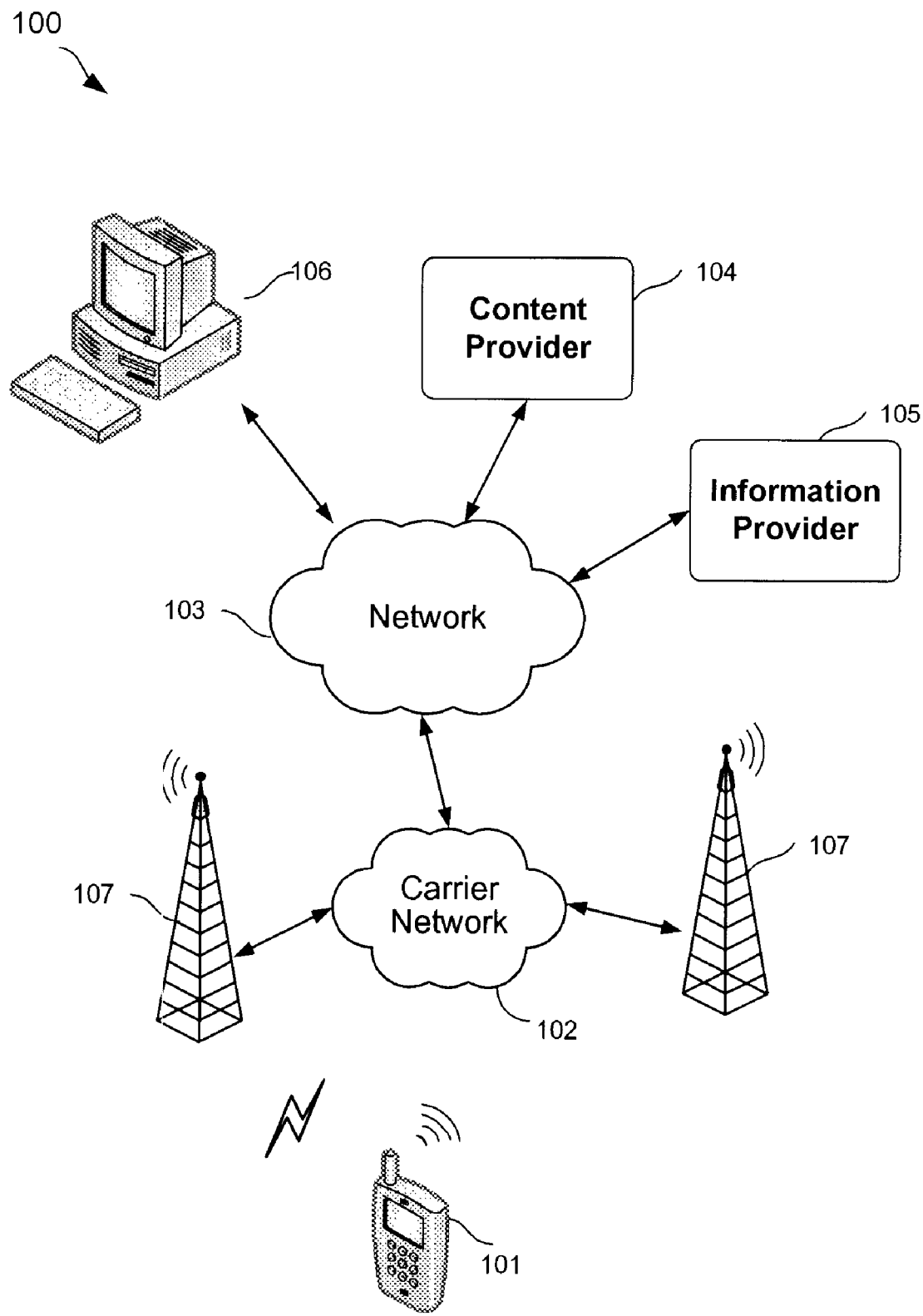
FIG. 1A is a diagram of an exemplary mobile communication network.

FIG. 1A is a diagram of an exemplary mobile communication network 100. As shown, the exemplary mobile communication network 100 includes a mobile communication device 101 connected to a carrier network 102 through a base station 107. The mobile device 101 can be, for example, a wireless cellular telephone, a wireless-enabled personal digital assistant (PDA) or gaming device, a Pocket PC, a laptop computer, or another mobile device capable of communicating with the carrier network 102. The base stations 107 can be, for example, cellular towers in a cellular wireless network or access points in a wireless local area network (LAN) or metropolitan area network (MAN). The communication between the mobile device 101 and the base stations 107 is by way of a wireless link. Depending on the type of mobile device, the wireless link can be part of a cellular network, a WiFi network, or a WiMAX network. The carrier network 102 can provide voice and/or data services to a variety of mobile devices, including, for example, the mobile communication device 101. The voice services, in appropriate circumstances, may be carried on different channels than are the data services, or may be on the same channels.

The carrier network 102 can be a wireless carrier's proprietary network and can connect to other networks, including, for example, the network 103. The network 103 can be, for example, a wide area network (WAN), such as the Internet, or other public, private, or mixed network. Various other providers can also be connected to the network 103. For example, a content provider 104 can connect to the network 103, and the content provider 104 can provide users of the network 103 with information, such as, for example, information in the form of text, images, audio, video, or other formats.

An information provider, such as the information provider 105, can also connect to the network 103. The information provider 105 can provide services beyond merely providing network users with content. For example, the information provider 105 can include an Internet search engine. As another example, the information provider 105 can provide location-based services, such as targeted advertising services, to the mobile device 101.

Various computing devices can also connect to the network 103. These computing devices can be IP nodes of known geographic location (or approximate location), also called landmarks. Any device placed on an Ethernet-based Internet Protocol (IP) network generally has its own IP address. IP addresses can be 32-bit numbers (e.g., in the format of '4.68.122.78') or 128-bit numbers (e.g., IPv6) that uniquely identify a device. For example, a landmark 106 can connect to the network 103, through which a user can issue traceroute or ping commands to perform network-level measurements and analyze the network 103.

Figure 1B:
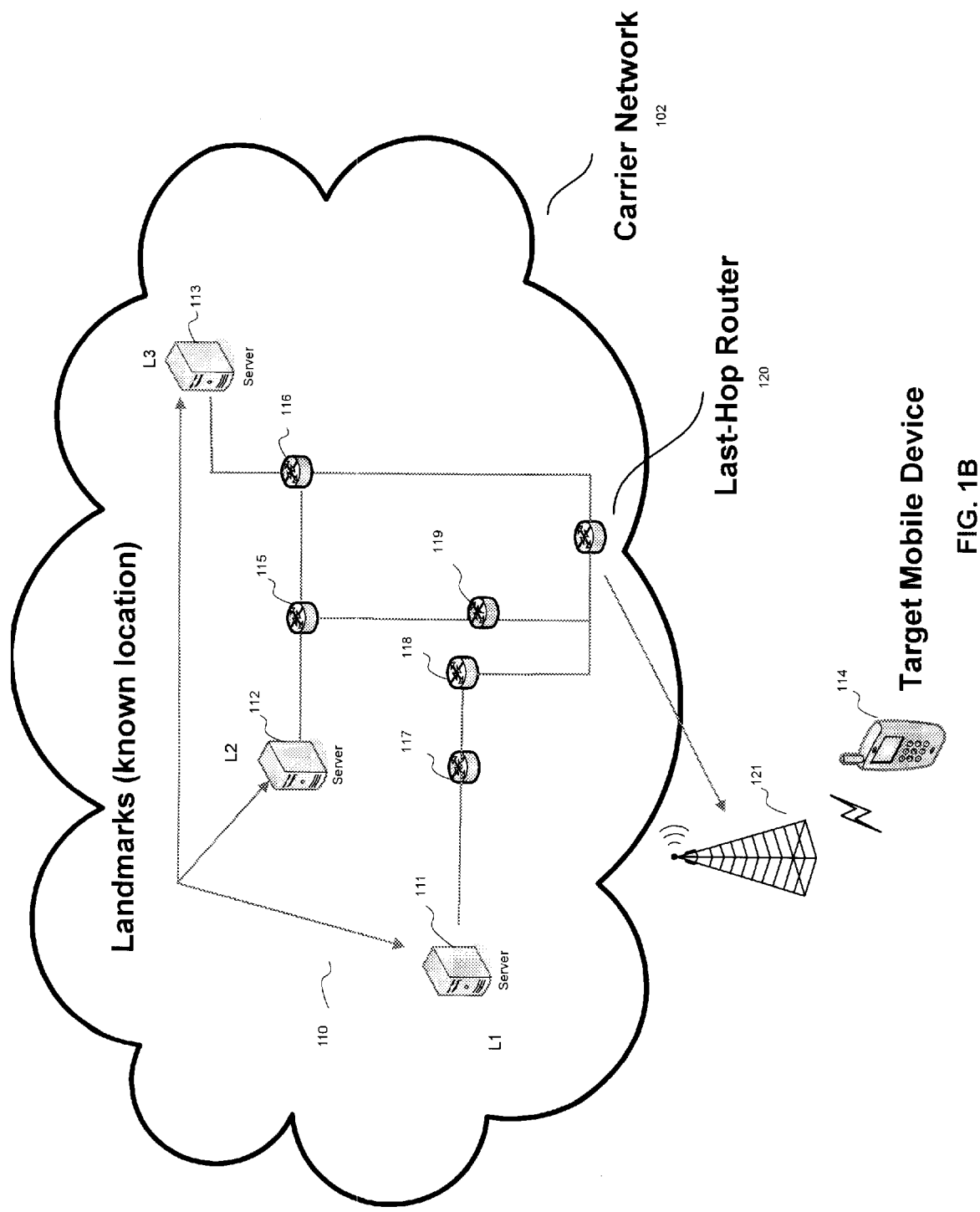
FIG. 1B is a diagram showing an exemplary network topology of a carrier network.

FIG. 1B is a diagram showing an exemplary network topology of a carrier network that connects landmarks to a target mobile device. As discussed above, a target mobile device 114 can connect to the carrier network 102 through the base station 121. As shown, the network topology 110 of the carrier network 102 can have various nodes and communication paths (e.g., fiber optic links). The various nodes in the network topology 110 can be landmarks (e.g., servers of known geographic location) 111-113 or routers 115-120, among other things. Data can traverse multiple routers 115-120 through the communication paths.

These routers 115-120 can be computer networking devices that forward data packets toward their destination. As an example, a data packet that originates from landmark 112 can first travel to the router 115 (known as an intermediate router). The intermediate router 115 can determine where the next wired hop should be (e.g., the best path to take given traffic conditions and bandwidth limitations) and forward the data packet to the next router in the wired hop. Depending on the data traffic and bandwidth availability, the next wired hop can be either intermediate router 116 or intermediate router 119. Eventually, the data packet encounters a last-hop router 120, which is the last router in the carrier network 102, before connecting to the base station 121. Thus, the communication paths between the landmarks 111-113 and the target device 114 can have a series of wired hops (through various routers) within the carrier network 102, followed by a last hop (which can include both wired and wireless hops) from the last-hop router 120 to the mobile device 114 via the base station 121. The routers 115-120 may in addition take various forms, and are not restricted to devices that work at a particular layer or layers in a network.

The location of an arbitrary node (with an IP address) in a network can be estimated using a network delay measurement that measures the time (delay value) it takes for a probe data packet to traverse from a landmark to the network node of interest, or from one selected node to another selected node. Referring again to FIG. 1B, a probe data packet can be sent from landmark 111 to the target mobile device 114 using a ping or traceroute utility, for example. Ping works by sending ICMP (Internet Control Message Protocol) "echo request" packets to the target node and listening for ICMP "echo response" replies. Using interval timing and response rate, ping can estimate the round-trip time (generally in milliseconds) between nodes. The traceroute utility uses the returning data packets from network nodes to produce a list of nodes that the packets have traversed en route to the destination. Thus, the round-trip time from landmark 111 to the target device 114 can be determined using ping, traceroute, or other techniques. These network delay measurements can also measure the delays to intermediate routers along the path from the landmarks to the node of interest.

The network delay over the last hop (e.g., from the last-hop router 120 to the base station 121, and a wireless hop from the base station 121 to the mobile device 114 in FIG. 1B) can be one to two orders of magnitude greater than the network delay over a typical wired hop (e.g., from an intermediate router to the last-hop router). This increased delay in the last hop can be due to the lower bandwidth, higher error probabilities, and higher processing overheads (e.g., protocol processing, buffering, coding, translation, etc.) of converting from IP protocols to cellular network specific protocols. Despite the fact that the propagation speed over the wireless medium is somewhat greater than for optical fiber, this last-hop delay, and the variance in this delay, can overshadow the differences in the total path delays from different landmarks 111-113 to the target device 114. Therefore, in a carrier network, the last-hop router can be identified from the long, last-hop network delay.

Thus, for example, consider network delay measurements from two different landmarks (111 and 113) to the target device 114, where landmark 111 is geographically closer to the device 114 than landmark 113. Instead of having two fairly different distance estimates from two different landmarks as input to a trilateration process (which will be discussed in further detail below), the two distances obtained from the landmarks (111 and 113) can be almost the same, making the trilateration less accurate.

Additionally, by geographically localizing the last-hop router, instead of the target mobile device, this long network delay from the last hop can be eliminated from the network measurements. The network delay measurement over the last hop can also be used to infer that the end device is a mobile device since the increase in delay is so large. The last-hop delay can also be used to get a rough estimate of the distance of the device from the last hop router, if the characteristics of the network are known. In principle the carrier network 102 can also have wireless links, for example as in a wireless mesh network. If these backbone wireless links were much faster than the last-hop wireless link (e.g., where the backbone is a microwave or WiMAX connection, and the last-hop is a WiFi connection) then the same long network delay would still apply to the last-hop link. However, if they are similar in speed there is less reason to localize the last-hop router as a proxy for the device itself.

Figure 2:
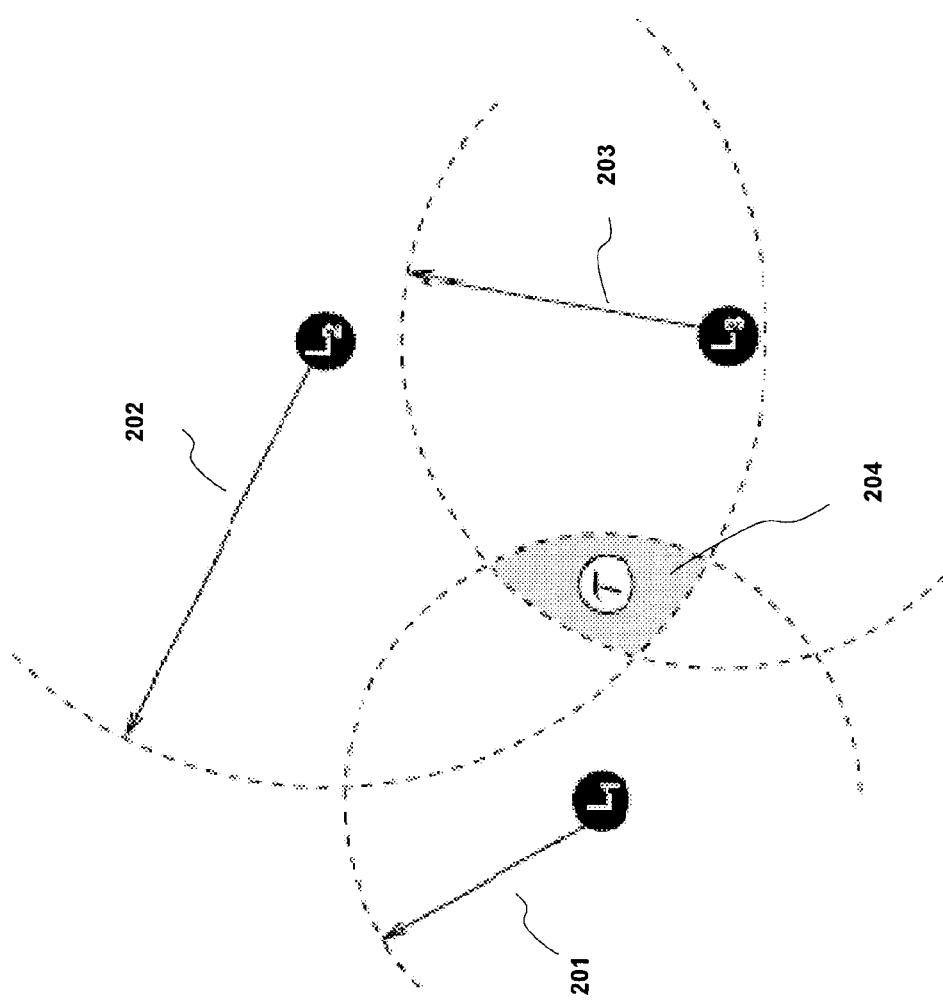
FIG. 2 is a diagram showing how constraint-based measurements can be used to localize a target device in an IP network.

FIG. 2 is a diagram showing how constraint-based measurements can be used to localize a target device in an IP network. By issuing a traceroute or ping command from multiple vantage points or landmarks to a target device having an IP address, a geographic localization of a target device can be obtained. Each delay measurement is converted into a constraint on the geographic distance from the landmark to the target device, given the speed of propagation of a data packet in the network. For example, assuming no other obstacles (e.g., queuing delays), the propagation speed of a data packet in optical fiber is approximately two-thirds the speed of light ('c', in meters/second) in vacuum. If the round-trip delay between a landmark (e.g., L1) and the target device is 'd' seconds, the target device lies in the region bounded by a circle of radius d*c/3, centered at L1.

The circle centered at L1 in FIG. 2 has a radius 201 obtained from the network delay between L1 and the target device. The circle centered at L2 has a radius 202 obtained from the network delay between L2 and the target device. The circle centered at L3 has a radius 203 obtained from the network delay between L3 and the target device. The geographic localization of a target device is further refined by taking the overlapped region or intersection 204 of these circular bounds from multiple landmarks that have communicated with the target device. Therefore, network delay constraints from multiple landmarks can be used to bound the geographic location of the target device. The intersection of all the constraint boundaries associated with the landmarks can represent the geographic localization of the target device. As shown in FIG. 2, the process of arriving at this intersection from multiple boundary constraints can be similar to that of trilateration. In general a variety of techniques exist for calculating an estimate for the target location using a multitude of such measurements.

Figure 3A:
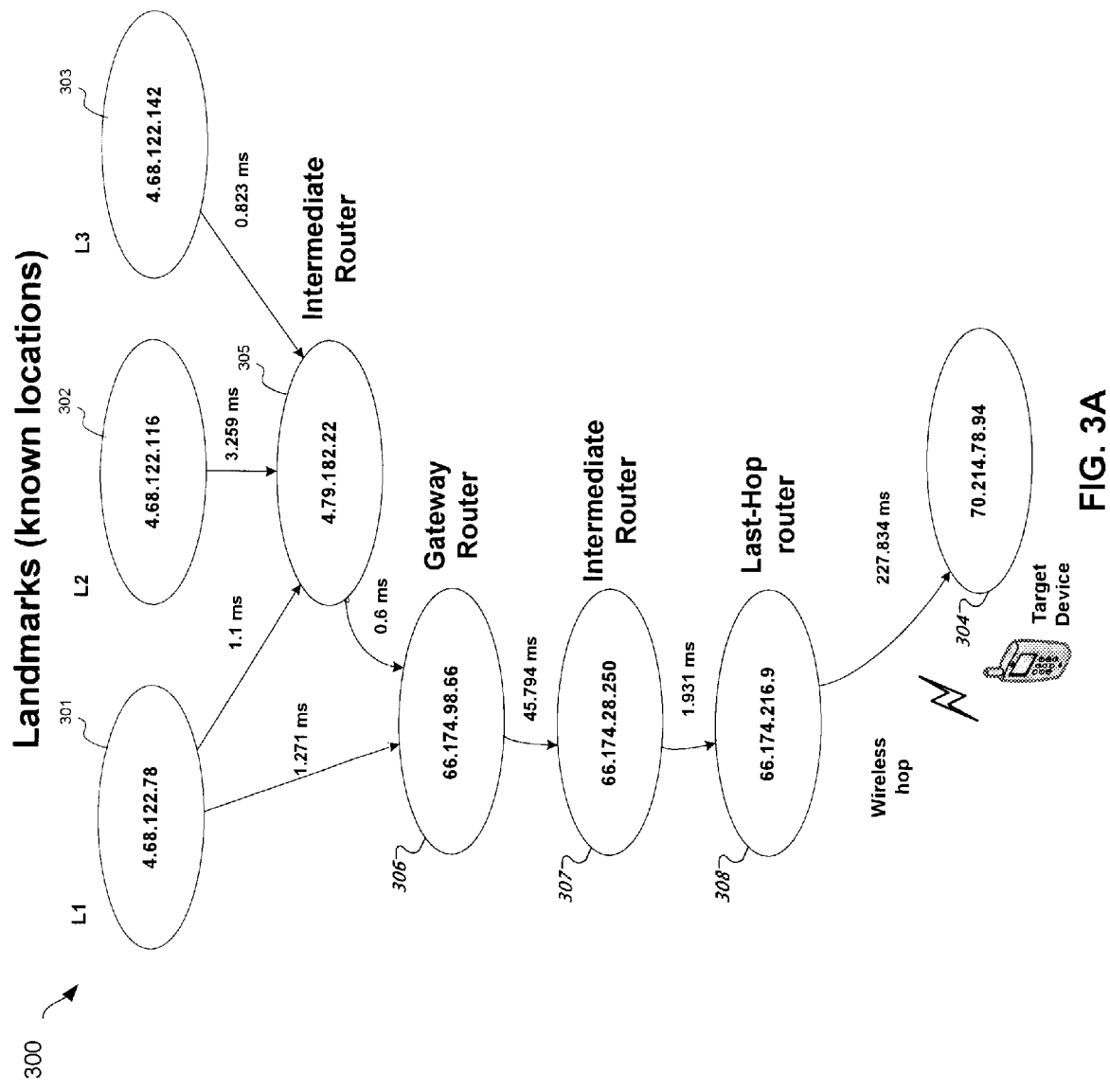
FIG. 3A is a network diagram showing exemplary communication paths between landmarks and the target mobile device.

FIG. 3A is a network diagram 300 showing exemplary communication paths between landmarks and the target mobile device. In FIG. 3A, the network diagram 300 includes network nodes of landmarks 301-303, the target mobile device 304, intermediate routers 305 and 307, the gateway router 306, and the last-hop router 308. The network nodes are represented by IP addresses.

Further, the network diagram 300 also shows the network delays between neighboring nodes. As discussed above, the last-hop delay overwhelmingly dominates the overall network delay measurement. Most wireless carriers have only a few gateway routers from the Internet to their network. The gateway router 306 can be a router with specialized billing or network security functionalities or attached to a host computer with such functionalities. Paths from different landmarks to the target device must enter through these gateways.

Two paths that enter the same gateway subsequently typically traverse the same sequence of hops until they reach the target device. For example, despite the geographic separation, landmarks 301 and 303 end up sharing the same path (through intermediate routers 306 and 307) to the last-hop router. Thus the presence of gateways and the problem of "shared paths" reduce the diversity of the paths, hence reducing the independence of the delay measurements using multiple landmarks. The "shared path" problem further reduces the information fed to the trilateration process, thereby reducing its accuracy in geographic localization.

When a wireless carrier's network has only a few gateways (or peering points) to the IP network, the constraint-based measurements may not be sufficient to accurately localize a mobile device. This is because the carrier network can be somewhat opaque and hard to understand, possibly for security or other operational reasons. This can complicate constraint-based techniques, such as the process of understanding and utilizing delay measurements. The carrier network can be a large network both in terms of geographic extent and number of network hops. A significant proportion of the communication path from a landmark to the target device (even ignoring the last hop) can traverse the carrier network and suffer these complications and resulting inaccuracies. The wireless carrier might also only expose the IP address of a proxy host or gateway router and not all the intermediate routers. Therefore, in practice, the IP address might be used to localize only the proxy host. Since proxies typically serve large regions (e.g. a region covering many states in the US), the resulting localization can be very coarse.

Figure 3B:
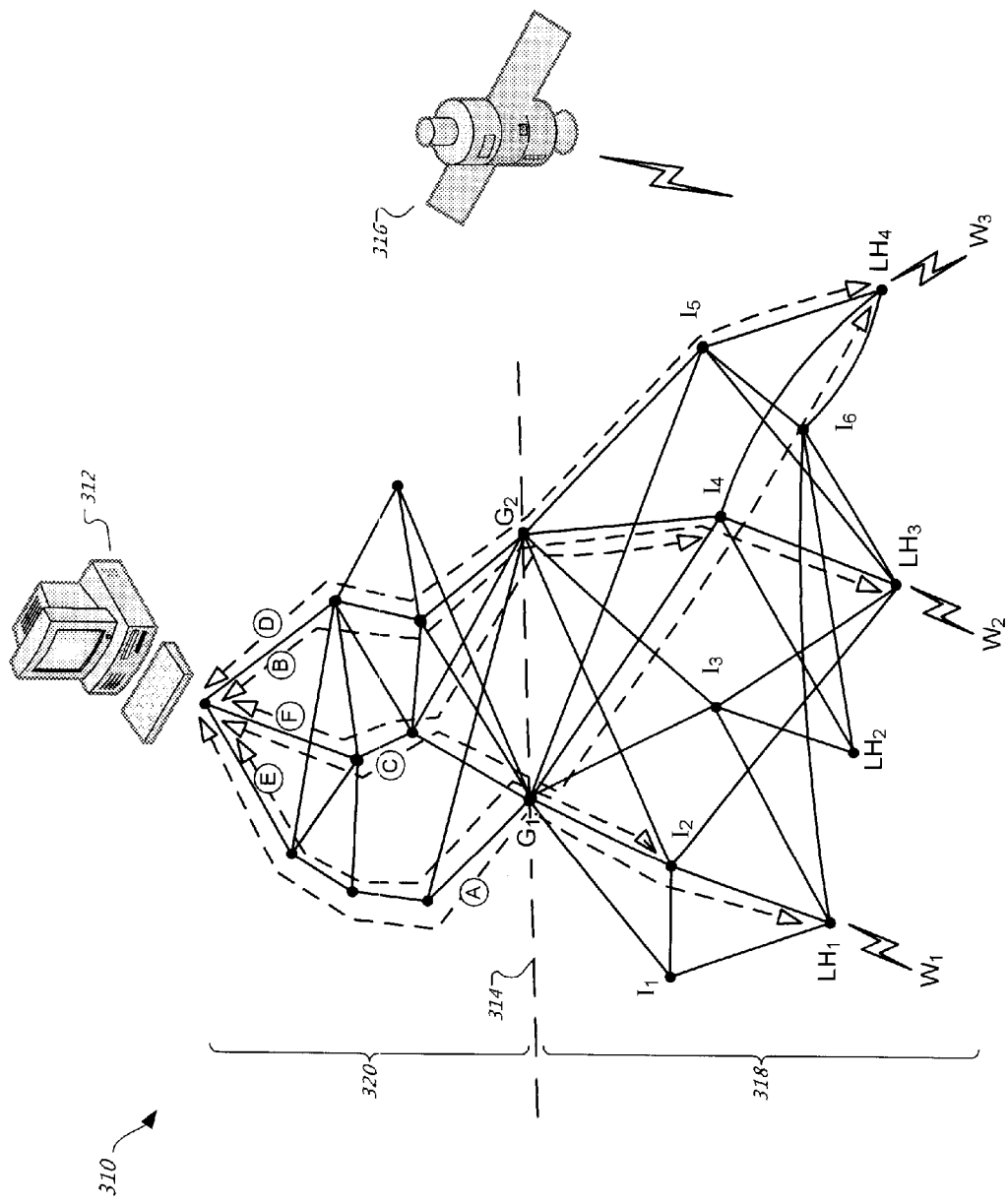
FIG. 3B shows a conceptual diagram of a system for locating devices in a relatively opaque network.

FIG. 3B shows a conceptual diagram of a system 310 for locating devices in a relatively opaque network. Again, system 310 is shown as a number of nodes in a network connecting an investigatory system 312 to a plurality of wireless devices W1, W2, W3. The investigatory system 312 is shown as a standard computer, but can take the form of any appropriate computing system that seeks to determine the locations of nodes in the network. Such determination can include locating wireless devices W1, W2, W3, or locating other nodes in the network such as last-hop routers LH1-LH4, gateways G1-G2, or other intermediate nodes 11-15 between the wireless devices W1, W2, W3 and the investigatory system 312.

In general, system 310 can operate by establishing locations of one or more of wireless devices W1, W2, W3, in the network such as in a private network 318 that is separated (312) by gateways G1-G2 from a public network 320, such as the Internet. The wireless devices W1, W2, W3 can report their locations to the investigatory system 312, and the investigatory system 312 can then communicate with the wireless devices W1, W2, W3 to estimate locations of last-hop routers LH1, LH3, LH4 serving wireless devices W1, W2, W3. With the locations of these last-hop routers estimated, the system 310 can then attempt to estimate the locations of other nodes in the network. This process can be carried out iteratively to further refine and narrow location estimates for each node. With the locations of the various fixed nodes in the network estimated, the system 310 can then more readily estimate the location of later wireless devices that seek to use private network 318, such as by correlating a last-hop router serving such a wireless device with a previously estimated and stored location.

A particular exemplary flow of operations in system 310 is indicated by lettered arrows A-F, which show, chronologically, operations that can occur to locate devices and nodes. The particular order can also be changed as appropriate, other actions can be added, and actions can be combined with each other or deleted. Arrow A shows an initial communication session between investigatory system 312 and wireless devices W1. The communication session can involve, for example, wireless device W1 reporting its location to investigatory system 312, and investigatory system 312 obtaining an identifier, such as an IP address for last-hop router LH1. Wireless device W1 can be, for example, a device operated by an employee or other agent of an organization that operates investigatory system 312. Numerous such agents can "report in" to investigatory system 312 to identify locations of numerous last-hop routers in network 318. Wireless device W1 can be, for example, GPS-enabled so as to communicate with signals from satellite 316 to generate a location identifier that can be sent in a message to investigatory system 312.

The operations shown by Arrow A can result in the estimation of a location for last-hop router LH1, such as by creating a circle having a given radius around wireless device W1. In a similar manner, the location of last-hop router LH3 can be identified by communications indicated by Arrow B, and the location of last-hop router LH4 can be identified by communications indicated by Arrow D.

With the locations of one or more last-hop routers estimated, the process can then use such estimated locations to estimate the locations of related intermediate nodes I1-I6. For example, Arrow C shows a communication with last-hop router LH4, which can be used to estimate the location of intermediate nodes I4 and I6, and also gateway G1. In particular, the time of transmission between last-hop router LH4 and intermediate router I4 (or between intermediate router I6 and intermediate router I4) can provide a circle within which intermediate router I4 is likely to be located. A further communication indicated by Arrow B can provide a further constraint on the location of intermediate router I4, based on its time of transmission with last-hop router LH3. Further transmission can also be used to provide additional constraints on the location of intermediate router I4. Similar communications can occur to provide constraints on the possible locations for other nodes in the network, such as shown by Arrow E, with respect to intermediate node I2 and other nodes in the path of the communication.

Transmission times for multiple links in a transmission can be identified for each communication. Also, multiple transmission times for a single link can also be identified when various communications are made. The multiple transmission times for a single link can be resolved to find a likely length of the link, such as by taking the shortest time under the assumption that the other times represent various delays that do not reflect the distance between the nodes.

With various communications completed in the network (generally, more communications will bring greater precision in location, and more communications will be required where the network contains more nodes), the locations of the various nodes can be estimated as described above and below. In addition, further communications can be generated later to provide additional precision and/or to account for movement of nodes in the network.

With the location of the relatively fixed nodes determined, the system 310 can then better estimate the location of other wireless devices in the network. For example, a wireless device that uses last-hop router LH3 can be inferred to be within a set distance of the area estimated to be the location of last-hop router LH3. Likewise, the location of a wireless device that uses last-hop router LH2 can also be estimated even if last-hop router LH2 was never registered with the investigatory system 312, such as by using the estimated location of Intermediate nodes I3 an I6, and related transmission times.

Figure 4A:
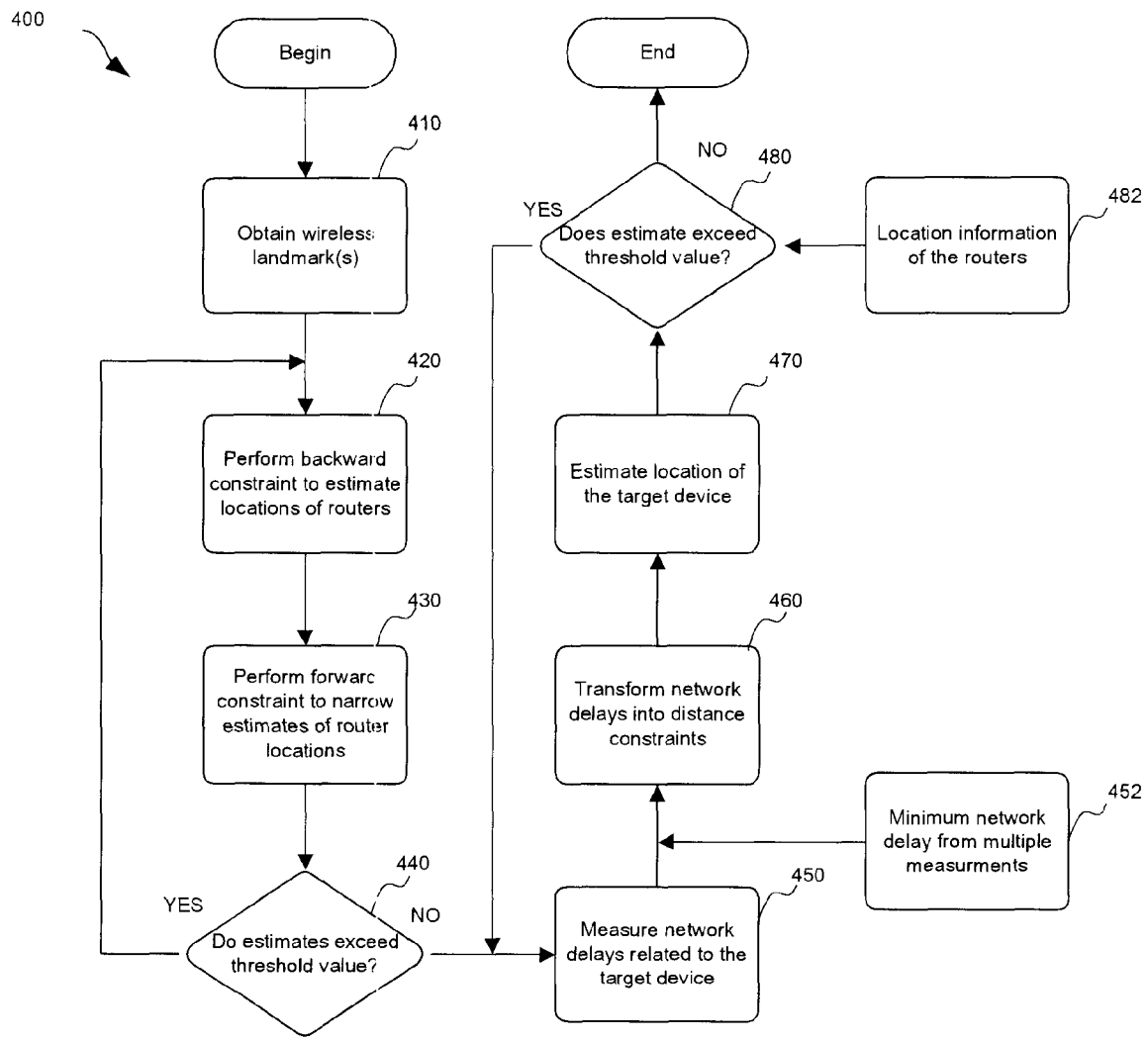
FIG. 4A is a flow diagram illustrating how a wireless landmark can be used to provide geographic localization of a target mobile device, according to some embodiments.

FIG. 4A is a flow diagram illustrating how a wireless landmark can be used to provide geographic localization of a target mobile device, according to some embodiments. As discussed earlier, the localization of a last-hop router can be used for localizing the target mobile device because the last-hop delay can overwhelm and render the network delay measurements erroneous. Despite the large geographical extent of the wireless carrier network, the geographic area that a last-hop router serves can be quite small (e.g., approximately 50 miles). Thus, by localizing the last-hop router, the localization granularity for a target mobile device can be limited to that region (e.g., approximately 50 miles).

A bi-directional constraint-based process 400, similar to that discussed with respect to FIG. 3B, can be used to reveal the network topology of an opaque carrier network and improve the accuracy in geographically localizing a target mobile device. Wireless landmark(s) can be obtained 410 and established for network delay measurements. A wireless landmark can be any mobile device in a mobile communication network with an IP address and a known geographic location. For example, the wireless landmark can be a wireless cellular telephone, a wireless PDA or gaming device, a Pocket PC, a laptop computer, or some other mobile device capable of communicating with the carrier network. Additionally, the geographic location of the wireless landmark can be obtained precisely (e.g., using GPS) or imprecisely (e.g., only knowing the last-hop router serving the device and using a constraint-based measurement as discussed above to localize the last-hop router).

Figure 4C:
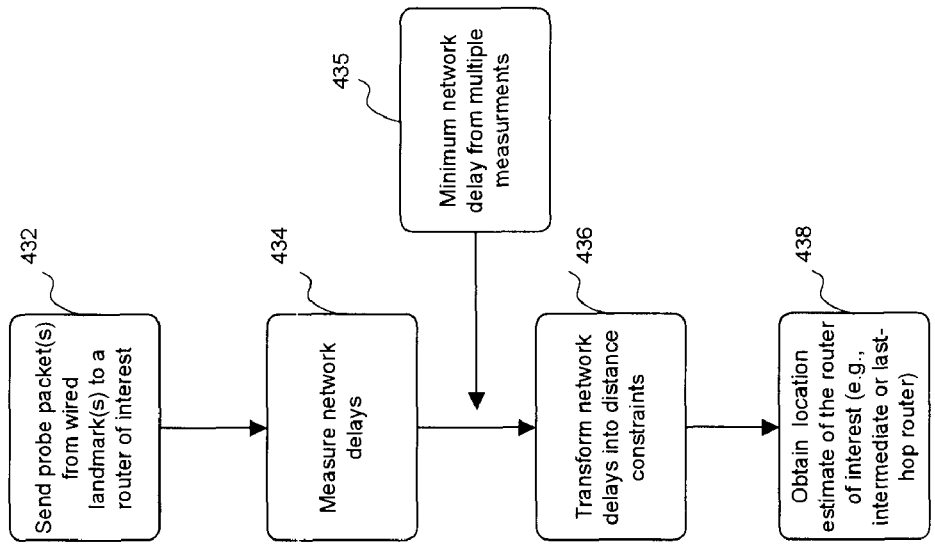
FIG. 4C is a flow diagram illustrating an exemplary forward constraint for narrowing location estimates of the intermediate and the last-hop routers, according to some embodiments.
Figure 4B:
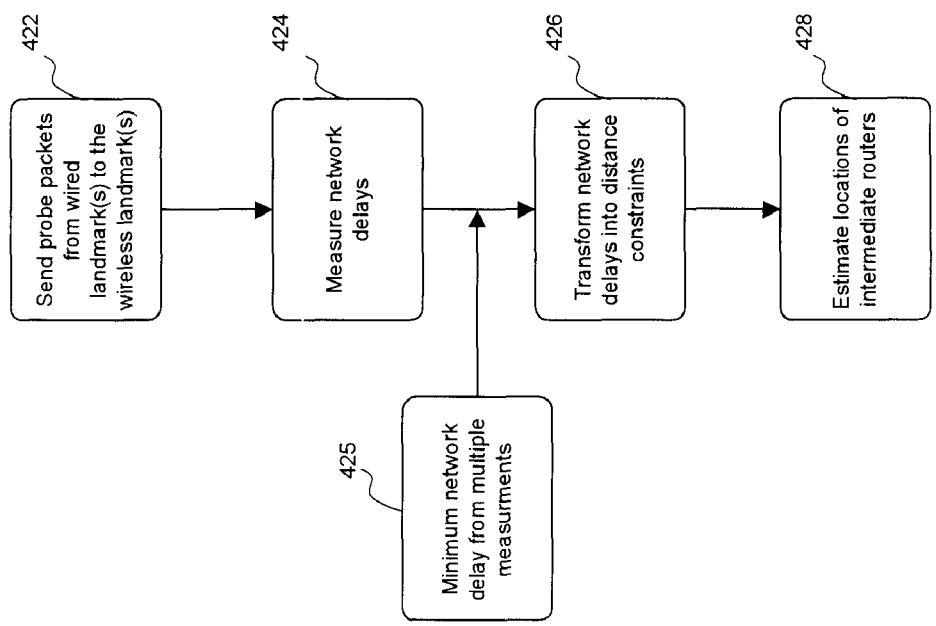
FIG. 4B is a flow diagram illustrating an exemplary backward constraint for estimating locations of the intermediate and the last-hop routers, according to some embodiments.

The wireless landmark(s) can be used in a backward constraint 420 to estimate locations of routers along the communication paths between a landmark and the target mobile device. As shown in FIG. 3A, these routers can be gateway, intermediate, or last-hop routers. FIG. 4B is a flow diagram illustrating an exemplary backward constraint for estimating locations of the intermediate and the last-hop routers, according to some embodiments. Probe data packets can be sent 422 from wired landmarks to the wireless landmark. The wired landmarks can be nodes (e.g., servers) connected to the IP network through optical fibers. The wireless landmarks can be nodes (e.g., mobile devices) connected to the IP network through wireless links (e.g., cellular, WiFi, or WiMAX links). Network delays can be measured 424 (e.g., by using traceroute or ping commands) between the wired landmarks and the wireless landmark. Multiple probe data packets can be sent from each of the wired landmarks to obtain a minimum network delay 425 associated with a particular wired landmark. The minimum network delays from all the wired landmarks can be transformed 426 into distance constraints. These distance constraints can be represented by circular boundaries as shown in FIG. 2.

Since the approximate location of the last-hop router is known (by initially assuming that the wireless landmark is geographically close to the last-hop router), working backwards from this location (hence the name "backward constraint"), location estimates can be obtained 428 for the intermediate routers. Any additional localization information can be incorporated into the backward constraint 420, even if it only applies to a subset of landmarks or routers. For example, if a subset of the routers have location-rich names (e.g., routers having city names, airport codes, or areas codes as part of their names), the constraints derived from these can be included in the calculations.

Once the locations of routers are initially estimated, a forward constraint 430 (FIG. 4A) can be used to perform network delay measurements between wired landmarks and the intermediate and last-hop routers. The forward constraint 430 can be used to further narrow the location estimates of routers along the communication paths between the wired landmarks and the target mobile device. FIG. 4C is a flow diagram illustrating an exemplary forward constraint for narrowing location estimates of the intermediate and the last-hop routers, according to some embodiments. Probe data packets can be sent 432 from wired landmarks to a router of interest. For example, the router of interest can be an intermediate router or the last-hop router along the communication paths between the wired landmarks and the target mobile device. Network delays can be measured 434 (e.g., by using traceroute or ping commands) between the wired landmarks and the router of interest. Multiple probe data packets can be sent from each of the wired landmarks to obtain a minimum network delay 435 associated with a particular wired landmark. The minimum network delays from all the wired landmarks can be transformed 436 into distance constraints. These distance constraints can be represented by circular boundaries as shown in FIG. 2. The location estimate of the router of interest can be obtained 438 from the intersection of the boundary circles.

The location estimates obtained from the forward constraint can be compared 440 (FIG. 4A) to a predetermined threshold localization value. As long as the geographic localization of the routers improves (e.g., the intersection or the overlapped region of the multiple constraint boundaries shrinks in size), the combination of backward and forward constraints is iterated. This looping process can be terminated when a predetermined threshold localization (e.g., 10 miles) of the routers has been reached. In cases where the localization result oscillates (e.g., for one iteration the localization region of router A shrinks and that of router B increases, and the reverse occurs for the following iteration), more sophisticated stopping criteria can be used. As an example, a mean threshold localization value for all routers can be used so that the iterative process can be continued as long as the mean localization region over all routers shrinks by an amount greater than some threshold value.

Network delays related to the target mobile device can be measured 450 by sending a probe data packet from wired landmarks to the target mobile device. As will be discussed in further detail below, a minimum network delay 452 can be determined from multiple measurements. The network delays from each of the wired landmarks can be transformed 460 into distance constraints as discussed earlier. These distance constraints can be represented by circular boundaries as shown in FIG. 2. The location of the target device can be estimated 470 from the intersection of the constraint boundaries. Furthermore, the location estimate of the target mobile device can be compared 480 to a predetermined threshold value (e.g., 50 miles) and an iterative process can be used to narrow the geographic localization of the mobile device. The location information 482 of the intermediate and the last-hop routers can be used as additional input to improve the localization of the mobile device. As discussed earlier, having location estimates for the routers (hence the network topology of the carrier network) improves the localization process because errors due to "shared paths" can be minimized.

Further, network delays in addition to propagation delay (e.g., queuing delays due to congestion and buffering at routers) can be taken into account in the location estimate of the target mobile device. For example, multiple traceroute commands can be issued from the same landmark in order to obtain a convergence of a minimum network delay between the landmark and the target device. In theory, any measurements that show a network delay greater than the minimum along a path are most likely due to effects other than the propagation delay in the optical fiber. Further, techniques such as packet-pair dispersion can be used to estimate bandwidths of links (or bottleneck links) along the communication path. These techniques can be used to estimate the component of the network delay measurement that is due to transmission speed limitations, and subtracted from the overall delay. These techniques for removing non-propagation delays in network measurements can allow the wireless link to be used in the localization process and not just the last-hop router. This is because once the non-propagation components are removed from the network delay measurements, the resulting network delay can accurately represent the distance between two nodes, even if the path is a wireless link.

Figure 5B:
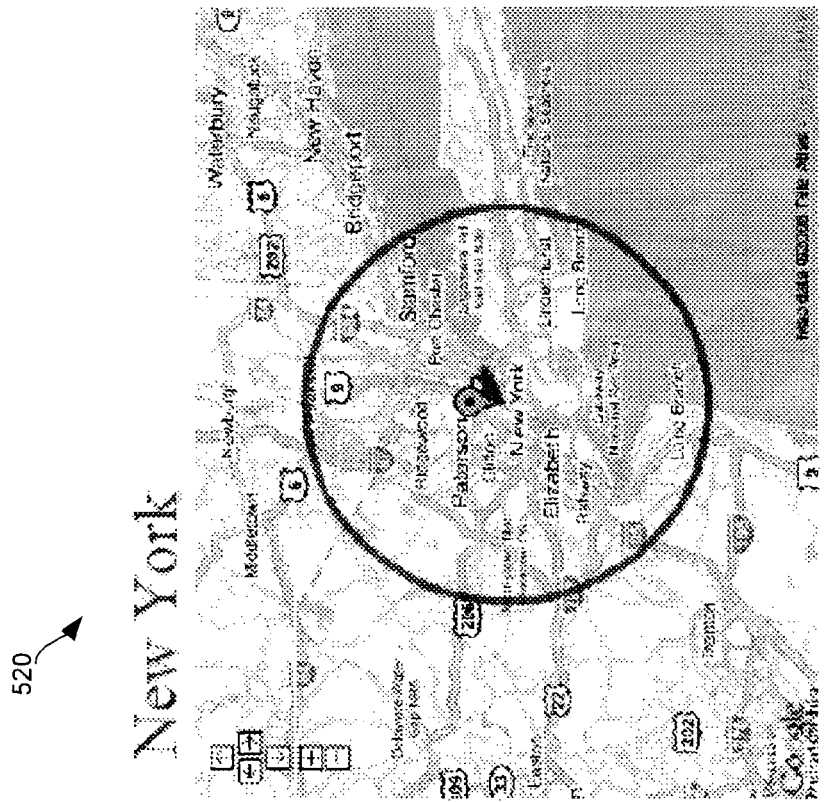
FIGS. 5A and 5B show exemplary results from geographic localization of mobile devices.
Figure 5A:
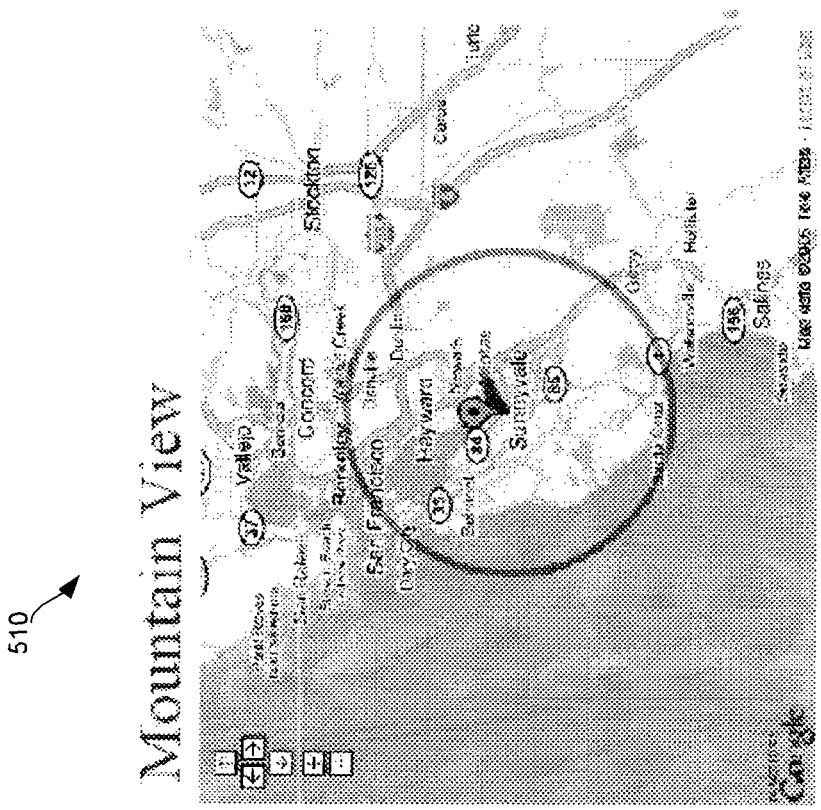

FIGS. 5A and 5B show exemplary results from geographic localization of mobile devices. The geographic localization can be achieved for a mobile device located around Mountain View, Calif. (as shown in FIG. 5A) and New York, N.Y. (as shown in FIG. 5B). These results 510, 520 show that a localization granularity of approximately metropolitan area can be achieved using an exemplary bi-directional constraint-based process 400.

Figure 6:
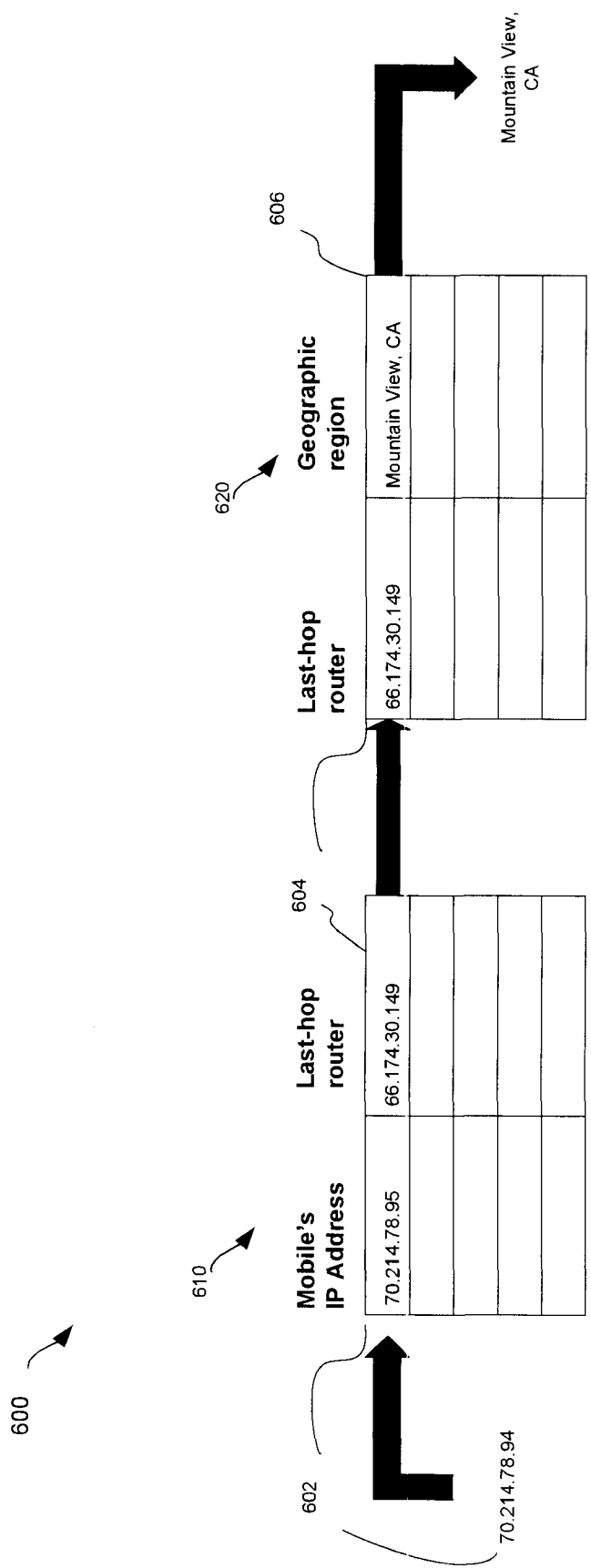
FIG. 6 is a diagram showing a quasi-static mapping technique for localizing mobile devices, according to some embodiments.

FIG. 6 is a diagram showing a quasi-static mapping technique for localizing mobile devices, according to some embodiments. Localization using the constraint-based techniques discussed above can involve taking network delay measurements from the wired landmarks to the target device, which can be time consuming and, in some cases, may not always be possible (e.g., if there is intermittent connectivity over the wireless link). However, these network delay measurements need not be taken in real time in order to provide geographic localization for every mobile device. This is because the network topology of the wireless carrier network can be quasi-static (e.g., not modified very frequently). Thus the range of IP addresses served by a particular last-hop router, as well as the geographic region served by that router, can also be regarded as quasi-static.

As shown in FIG. 6, the quasi-static mapping technique 600 can include a first database 610 and a second database 620. The IP address of a target mobile device 602 can be entered into the first database 610. The first database 610 maintains information of the mobile device's IP address 602 and the corresponding last-hop router's IP address 604 that typically serves the mobile device. The second database 620 maintains information of the last-hop router's IP address 604 and the corresponding geographic region 606 that it serves. These two databases (610 and 620) are quasi-static and can be computed, as well as updated periodically, offline. Having information contained in these databases (610 and 620), localizing a mobile device can be achieved by performing a simple lookup on the first database 610 followed by the second database 620. For example, in FIG. 6 the mobile device with an IP address of 70.214.78.94 can be localized by looking at the first database 610 to determine the IP address of its last-hop router 604. This information can then be used as an input to the second database 620 in order to determine the geographic region associated with this particular last-hop router. The resulting localization for the mobile device (Mountain View, Calif., in this example) can be produced.

While taking multiple network delay measurements in real time has been discussed above (e.g., to remove queuing delays) it can be much more convenient to do so offline (e.g., measurements not taken in real time). The quasi-static mapping technique 600 can be combined with the bi-directional constraint-based process 400 to facilitate localization accuracy, since multiple delay measurements can be taken offline, and the second database 620 can be populated using the lowest measured delay. This embodiment allows a historical database of localization estimates for the last-hop and intermediate routers to be built up over time. For example, if two mobile devices are associated with the same last-hop router, and result in different localization regions, this information can be stored for later processing. Over time, a statistical analysis can be carried out using a large number of such inferred regions to find a "composite" region that has the maximum likelihood of being the correct estimate.

Figure 7:
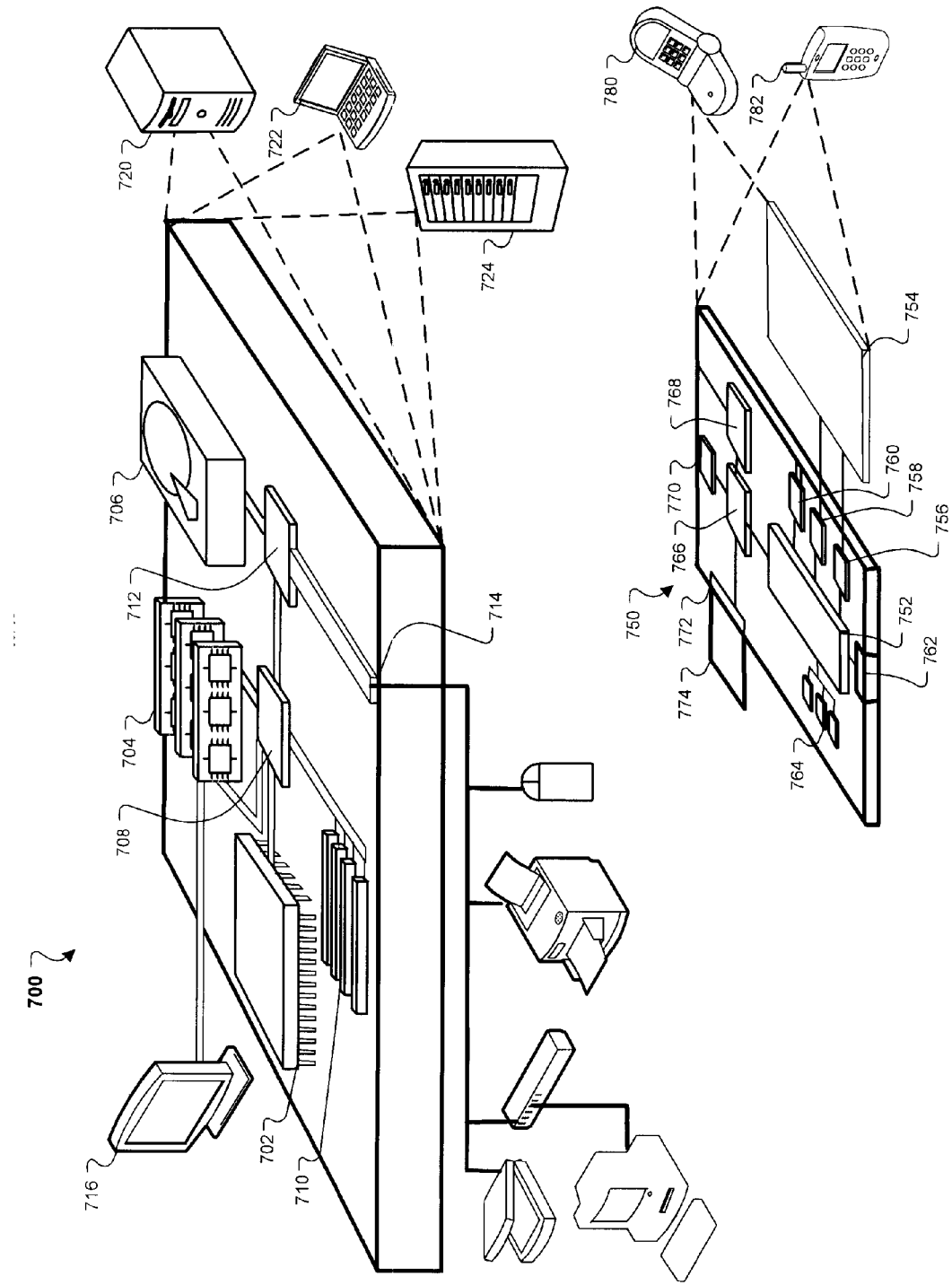
FIG. 7 is a block diagram of computing devices and systems.

FIG. 7 is a block diagram of computing devices and systems 700, 750. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments. Accordingly, other embodiments are within the scope of the following claims.

What is claimed is:

1. A non-transitory computer-readable medium having stored therein a computer-implemented method comprising:
    receiving from a wireless landmark a message that includes a location indicator generated by the wireless landmark, the location indicator comprising information that corresponds to a current location of a wireless landmark in a mobile communication network, the wireless landmark comprising a mobile device having a telephone that communicates through the mobile communication network;
    communicating with the wireless landmark to estimate the location of a first node in the mobile communication network proximate to the wireless landmark with the estimated location of the first node being based on the current location of the wireless landmark, the first node being a fixed location apparatus for routing communications with the mobile device and other mobile devices; and
    determining an estimated location of another, different mobile device using the determined location of the first node.

2. The method of claim 1, further comprising:
    determining estimated locations of one or more intermediate nodes in the mobile communication network using the estimated location of the first node; and
    outputting one or more estimated locations of the one or more intermediate nodes.

3. The method of claim 2, wherein the one or more intermediate nodes comprise one of intermediate routers or one of last-hop routers.

4. The method of claim 2, wherein determining estimated locations of one or more intermediate nodes in the mobile communication network comprises obtaining network delay values between nodes in the network, and transforming the network delays into distance constraints.

5. The method of claim 4, wherein obtaining network delay values comprises performing a plurality of network delay measurements and selecting a minimum network delay from the plurality of network delay measurements.

6. The method of claim 5, wherein obtaining network delay values further comprises obtaining a bandwidth delay and subtracting the bandwidth delay from the minimum network delay.

7. The method of claim 6, wherein obtaining the bandwidth delay comprises performing a packet-pair dispersion measurement.

8. The method of claim 4, wherein obtaining the location information of the one or more intermediate nodes comprises obtaining geographic boundaries for the one or more intermediate nodes based on the distance constraints.

9. The method of claim 8, wherein obtaining the geographic boundaries for the one or more intermediate nodes comprises identifying an overlapped region from a plurality of circles having radii derived from the distance constraints.

10. The method of claim 9, wherein obtaining the geographic boundaries for the one or more intermediate nodes further comprises narrowing the overlapped region by obtaining network delay values between one or more wired landmarks and the one or more intermediate nodes.

11. The method of claim 1, wherein the mobile communication network comprises a cellular network, a WiFi network, or a WiMAX network.

12. The method of claim 1, further comprising determining an estimated location of a mobile device by using the locations of one or more nodes of the one or more intermediate nodes whose locations have been estimated.

13. The method of claim 12, wherein determining an estimated location of the mobile device further comprises obtaining a geographic boundary for the mobile device based on distance constraints derived from the intermediate node locations.

14. The method of claim 1, further comprising iteratively communicating with wired landmarks in the mobile communication network to obtain network delay values for a plurality of network routes, and using the network delay values to improve the estimated locations of the one or more intermediate nodes.

15. The method of claim 1, wherein the geographic location of the mobile device is based on a GPS location.

16. The method of claim 1, wherein the mobile device is a wireless cellular telephone.

17. The method of claim 1, wherein the current location of the mobile device is determined at the time of the generation of the message.

18. The method of claim 1, further comprising outputting the estimated location of the first node.

19. A non-transitory computer-readable medium having stored therein a computer-implemented method comprising:
  obtaining an Internet Protocol (IP) address of a mobile device;
  obtaining an IP address of a router that serves a geographic region containing the mobile device, based on the IP address of the mobile device;
  determining a geographic region in which the router is located based on the IP address of the router; and
  outputting an estimated location of the mobile device based on the geographic region corresponding to the router;
  wherein determining a geographic region in which the router is located comprises:
    obtaining network delay values related to the router using location and constraint information of one or more wireless landmarks, the one or more wireless landmarks comprising one or more mobile devices that communicate through the router and include telephones, and
  translating the network delay values into distance constraints.

20. The method of claim 19, wherein the IP address of the router is obtained from a first database, and the geographic region corresponding to the IP address of the router is obtained from a second database that differs from the first database.

21. The method of claim 19, wherein the router comprises a last-hop router serving the mobile device.

22. The method of claim 21, wherein determining a geographic region in which the router is located further comprises obtaining a geographic boundary for the router based on the distance constraints.

23. The method of claim 22, wherein obtaining the geographic boundary for the router comprises obtaining an overlapped region from a plurality of circles having radii that are based on the distance constraints.

24. The method of claim 21, wherein the landmarks comprise one of wireless landmarks, wired landmarks, and intermediate landmarks.

25. A system for providing location estimates of network devices, the system comprising:
  a wireless landmark locator to receive current location information from a wireless landmark and identify a location for the wireless landmark, the wireless landmark comprising a first mobile device having a telephone that communicates through a wireless network;
  means for determining location information of one or more intermediate network nodes in the wireless network using the location for the wireless landmark with the estimated location of the one or more intermediate network nodes being based on the current location of a wireless landmark, the one or more intermediate network nodes being fixed location apparatuses for routing communications with the wireless landmark and other mobile devices; and
  a mobile device interface configured to estimate a location for a second mobile device communicating with the system using the location information of the one or more intermediate nodes.

* * * * *

UNITED STATES PATENT AND TRADEMARK OFFICE
CERTIFICATE OF CORRECTION

| | | |
|---|---|---|
| PATENT NO. | : 7,983,691 B1 | Page 1 of 1 |
| APPLICATION NO. | : 11/557097 | |
| DATED | : July 19, 2011 | |
| INVENTOR(S) | : Bernard Wong et al. | |

It is certified that error appears in the above-identified patent and that said Letters Patent is hereby corrected as shown below:

On the title page, item [54] (Title), Line 2 – delete "COMMUNCIATION" and insert
-- COMMUNICATION --, therefore.

First page, item [56] Column 2, Line 12 – delete "Interests" and insert -- Interest --, therefore.

Title, Column 1, Line 2 – delete "COMMUNCIATION" and insert
-- COMMUNICATION --, therefore.

Signed and Sealed this
Eighth Day of November, 2011

David J. Kappos
*Director of the United States Patent and Trademark Office*